US008958105B2

(12) United States Patent
Shibukawa et al.

(10) Patent No.: US 8,958,105 B2
(45) Date of Patent: Feb. 17, 2015

(54) IMAGE PROCESSING SYSTEM, IMAGE PROCESSING APPARATUS CONTROL METHOD, AND RECORDING MEDIUM STORING IMAGE PROCESSING APPARATUS CONTROL PROGRAM

(71) Applicants: Tomoki Shibukawa, Kanagawa (JP); Hajime Kubota, Kanagawa (JP)

(72) Inventors: Tomoki Shibukawa, Kanagawa (JP); Hajime Kubota, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/198,968

(22) Filed: Mar. 6, 2014

(65) Prior Publication Data

US 2014/0268225 A1 Sep. 18, 2014

(30) Foreign Application Priority Data

Mar. 12, 2013 (JP) ................. 2013-049516

(51) Int. Cl.
*G06F 3/12* (2006.01)
*G06K 15/02* (2006.01)
*H04N 1/00* (2006.01)

(52) U.S. Cl.
CPC ........ *G06K 15/1806* (2013.01); *H04N 1/00204* (2013.01); *H04N 1/00307* (2013.01); *H04N 1/00347* (2013.01); *H04N 1/00411* (2013.01); *H04N 1/00424* (2013.01); *H04N 1/00464* (2013.01); *H04N 1/00474* (2013.01); *H04N 1/00477* (2013.01); *H04N 1/0048* (2013.01); *H04N 1/00482* (2013.01); *G06F 3/1292* (2013.01); *H04N 1/00278* (2013.01);

(Continued)

(58) Field of Classification Search
None
See application file for complete search history.

(56) References Cited

U.S. PATENT DOCUMENTS 6,618,566 B2 * 9/2003 Kujirai et al. ................... 399/79
8,397,277 B2 * 3/2013 Tsujimoto ......................... 726/3

(Continued)

FOREIGN PATENT DOCUMENTS

JP   2004-227136   8/2004
JP   2006-086642   3/2006

(Continued)

OTHER PUBLICATIONS

European Search Report issued Oct. 2, 2014 in European Patent Application No. 14156894.9-1902.

*Primary Examiner* — Satwant Singh
(74) *Attorney, Agent, or Firm* — Oblon, Spivak, McClelland, Maier & Neustadt, L.L.P.

(57) ABSTRACT

An image processing system including an image processing apparatus and an information processing device. The information processing device includes a display controller to control displaying a screen on a display in accordance with user operation involving transition of the displayed screen and an operational information transmitter to transfer operational information on the user operation involving the transition of the displayed screen. The image processing apparatus includes an image processing apparatus screen transition processor to perform transition of screen on the image processing apparatus in accordance with receiving the operational information. The display controller acquires status on transitioning screen of the image processing apparatus in accordance with the user operation instructing to transition to a home screen as a starting point of the user operation and gets the screen displayed on the display back to status before the transition if the screen on the image processing apparatus is untransitionable.

8 Claims, 12 Drawing Sheets

(52) U.S. Cl.
CPC ....... *H04N1/00435* (2013.01); *H04N 1/00925* (2013.01); *H04N 1/00973* (2013.01); *H04N 2201/0039* (2013.01); *H04N 2201/0041* (2013.01); *H04N 2201/0049* (2013.01); *H04N 2201/0055* (2013.01); *H04N 2201/0075* (2013.01); *H04N 2201/0096* (2013.01); *H04N 2201/0094* (2013.01); *H04N 2201/0098* (2013.01)
USPC ........................................ 358/1.15; 358/1.13

(56) References Cited

U.S. PATENT DOCUMENTS

| | | | |
|---|---|---|---|
| 8,773,676 | B2* | 7/2014 | Tsujimoto .................... 358/1.13 |
| 2006/0290680 | A1 | 12/2006 | Tanaka et al. |
| 2008/0231890 | A1 | 9/2008 | Kishi |
| 2009/0005070 | A1 | 1/2009 | Forstall et al. |
| 2010/0231946 | A1 | 9/2010 | Shozaki et al. |
| 2011/0060951 | A1 | 3/2011 | Sako |
| 2011/0128564 | A1 | 6/2011 | Kayama |
| 2012/0062945 | A1 | 3/2012 | Goda |
| 2012/0327443 | A1* | 12/2012 | Fujii ............................ 358/1.13 |
| 2013/0070266 | A1* | 3/2013 | Hagiwara et al. .............. 358/1.9 |

FOREIGN PATENT DOCUMENTS

| | | |
|---|---|---|
| JP | 2008-193265 | 8/2008 |
| JP | 2011-103572 | 5/2011 |
| JP | 2012-061669 | 3/2012 |
| JP | 2012-203743 | 10/2012 |

* cited by examiner

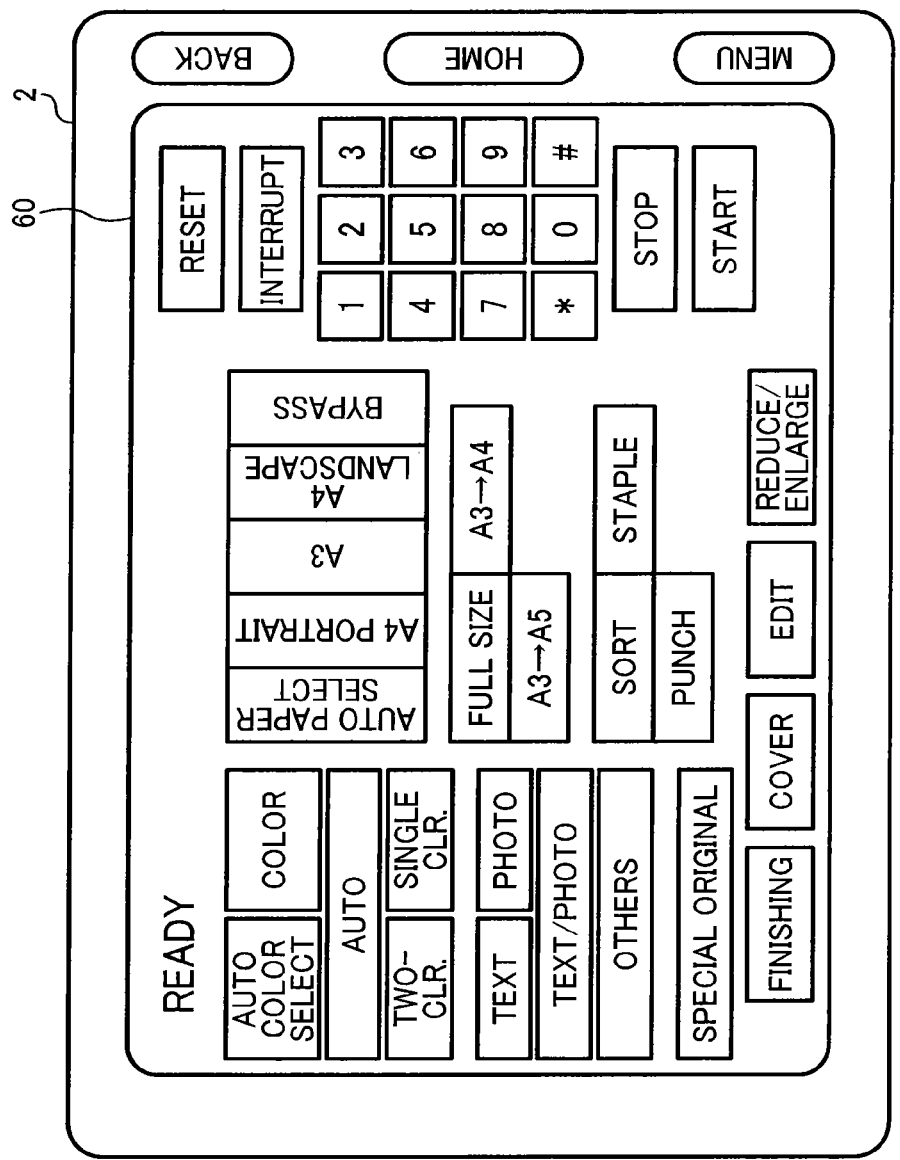

IMAGE PROCESSING SYSTEM, IMAGE PROCESSING APPARATUS CONTROL METHOD, AND RECORDING MEDIUM STORING IMAGE PROCESSING APPARATUS CONTROL PROGRAM

CROSS-REFERENCE TO RELATED APPLICATION

This patent application is based on and claims priority pursuant to 35 U.S.C. §119 to Japanese Patent Application No. 2013-049516, filed on Mar. 12, 2013 in the Japan Patent Office, the entire disclosure of which is hereby incorporated by reference herein.

BACKGROUND

1. Technical Field

The present invention relates to an image processing system, an image processing apparatus control method, and a recording medium storing an image processing apparatus control program.

2. Background Art

With increased computerization of information, image processing apparatuses such as printers and facsimiles used for outputting the computerized information and scanners used for computerizing documents have become indispensable. In most cases, these image processing apparatuses are configured as multifunctional peripherals (MFPs) that can be used as a printer, facsimile, scanner, and copier by implementing an image pickup function, image forming function, communication function, etc.

On the other hand, mobile phones have also become highly advanced, and mobile information processing devices such as smart phones and tablet devices that have information processing functions approaching the sophistication of PCs (hereinafter referred to as "mobile devices") have become popular. These mobile devices generally include a home screen as a starting point for user operations, with applications accessed via icons displayed on the home screen.

In these kinds of mobile devices, in order to cooperate with the image processing apparatuses effectively, a technology that displays a scanning configuration screen of the image processing apparatus on the mobile device and instructs the image processing apparatus to perform scanning in accordance with the configuration input on the configuration screen on the mobile device has been proposed (e.g., JP-2008-193265-A).

SUMMARY

An example embodiment of the present invention provides an image processing system comprised of an image processing apparatus and an information processing device. The information processing device includes a display controller to control displaying a screen on a display in accordance with user operation involving transition of the displayed screen and an operational information transmitter to transfer operational information on the user operation involving the transition of the displayed screen. The image processing apparatus includes an image processing apparatus screen transition processor to perform transition of screen on the image processing apparatus in accordance with receiving the operational information. The display controller acquires status on transitioning screen of the image processing apparatus in accordance with the user operation instructing to transition to a home screen as a starting point of the user operation and gets the screen displayed on the display back to status before the transition if the screen on the image processing apparatus is untransitionable.

Further example embodiments of the present invention provide an image processing apparatus control method, and a non-transitory recording medium storing an image processing apparatus control program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIGS. 8A and 8B are diagrams illustrating screens on the mobile device and the display panel as an embodiment of the present invention.

DETAILED DESCRIPTION

Figure 1:
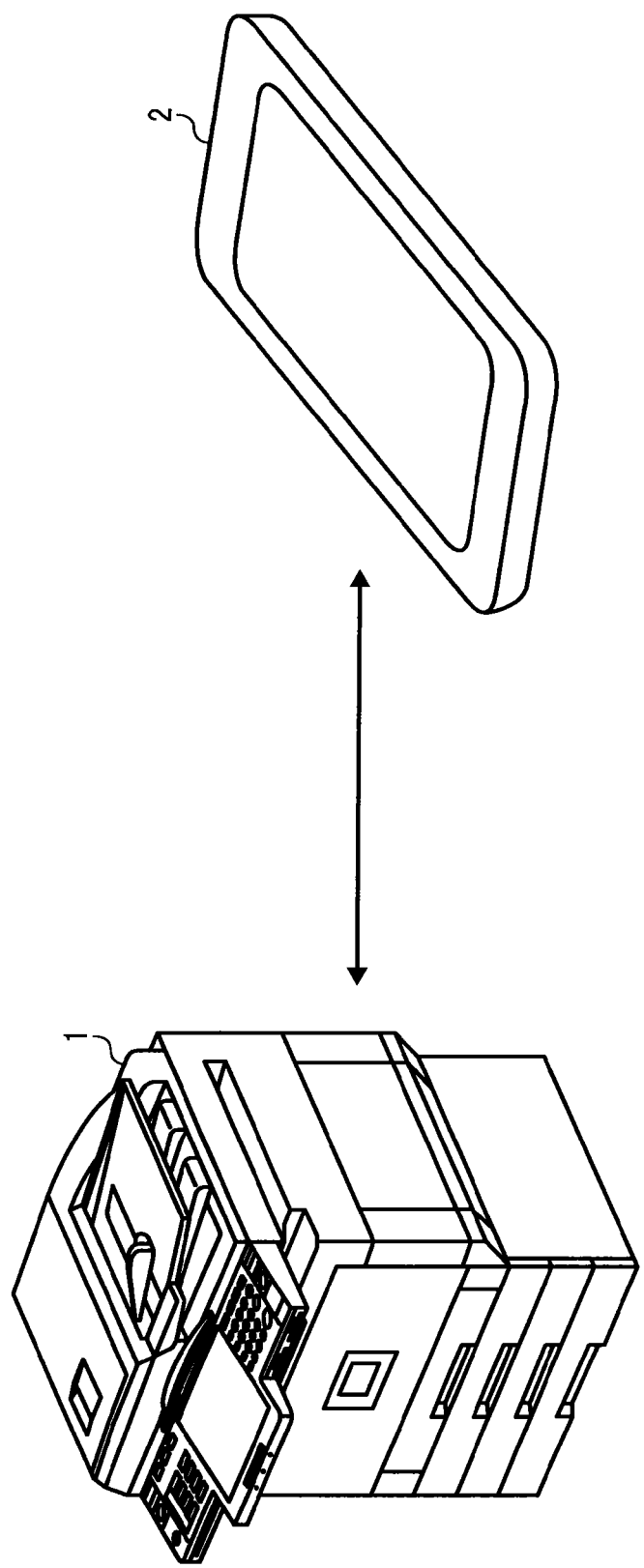
FIG. 1 is a diagram illustrating an image processing system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Many of mobile devices include interfaces such as a touch panel, GPS, velocity sensor, and wireless communications capability, and can be used for various purposes depending on the software. Consequently, those mobile devices can be used as a display panel to operate the image processing apparatuses described above remotely.

In using the mobile device as the display panel for the image processing apparatus as described above, it is desirable to control them so that the screen on the mobile device does not conflict with the display panel screen included in the image processing apparatus originally. However, since the image processing apparatus and the mobile device are controlled by different systems, in some cases the screens might be contradictory.

For example, the mobile device is capable of displaying a home screen for calling various functions, and it is generally configured to be able to transition to the home screen using a simple operation on items such as an icon and a hardware key always displayed on the screen. In case of keeping synchronization between the screen on the image processing apparatus and the screen on the mobile device, it is controlled that the transition to the home screen on the mobile device is reported to the image processing apparatus to transition to the home screen on the display panel included in the image processing apparatus.

In this case, if it is impossible to transition to the home screen forcibly due to some sort of error in the image processing apparatus, the display panel of the image processing apparatus does not transition to the home screen while the mobile device does transition to the home screen, resulting in a contradiction between screens.

This kind of issue can occur similarly not only when the mobile device is used as the control panel of the image processing apparatus but also when a device controlled by an operating system (OS) different from the image processing apparatus is used as the control panel of the image processing apparatus. That is, even if the device controlled by the OS different from the image processing apparatus is used not as a general-purpose mobile information processing device but as a dedicated control panel of the image processing apparatus wired-connected to the image processing apparatus, the screen generated by the mobile device conflicts with the screen generated by the image processing apparatus in some cases.

In the following embodiment, in case of using a device controlled independently from an image processing apparatus as the operational unit of the image processing apparatus, a system that can prevent the screen on the device from conflicting with the screen of the image processing apparatus is provided.

In the following embodiment, an image processing system in which the image processing apparatus is operated via a mobile device such as a smart phone and tablet device is taken as an example.

FIG. 1 is a diagram illustrating an image processing system in this embodiment. As shown in FIG. 1, in the image processing system of the present embodiment, an image processing apparatus 1 and a mobile device 2 are communicably connected with each other.

In the present embodiment, the image processing apparatus 1 is a MFP that implements an image pickup function, image forming function, and communication function and can be used as a printer, facsimile, scanner, and copier. The mobile device 2 is a portable information processing device such as a smart phone, tablet device, and Personal Digital Assistant (PDA). In this embodiment, the mobile device 2 is an information processing device controlled independently from the main unit of the image processing apparatus 1 and functions as a control panel to control the image processing apparatus 1 by installing application programs provided by a manufacturer of the image processing apparatus and a third party.

Next, hardware of the image processing apparatus 1 and the mobile device 2 included in the image processing system of this embodiment is described below.

Figure 2:
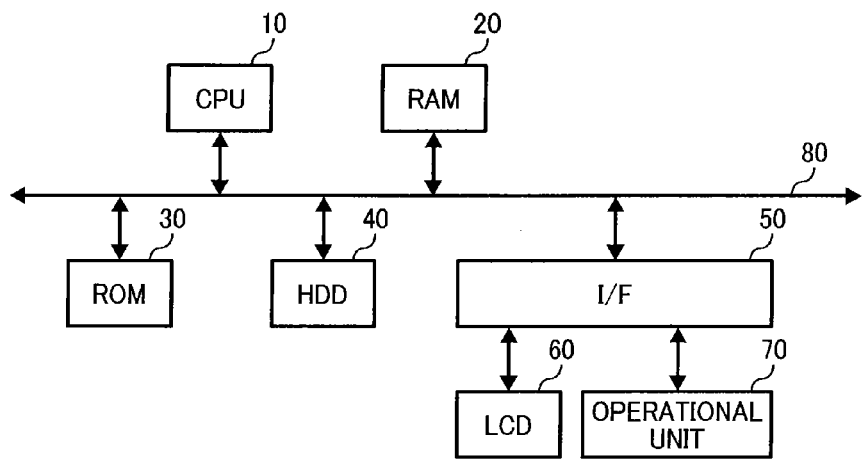
FIG. 2 is a block diagram illustrating a hardware configuration of an information processing device as an embodiment of the present invention.

FIG. 2 is a block diagram illustrating a hardware configuration of the image processing apparatus. As shown in FIG. 2, the information processing device in this embodiment includes the same configuration as a general server or PC etc.

That is, in the information processing device in this embodiment, a Central Processing Unit (CPU) 10, a Random Access Memory (RAM) 20, a Read Only Memory (ROM) 30, a hard disk drive (HDD) 40, and an interface (I/F) 50 are connected with each other via a bus 80. In addition, a Liquid Crystal Display (LCD) 60 and an operational unit 70 are connected to the I/F 50. Besides, the image processing apparatus 1 includes an engine that executes forming an image, outputting the image, and scanning.

The CPU 10 is a processor and controls the whole operation of the information processing device. The RAM 20 is a volatile storage device that can read/write information at high speed and is used as a work area when the CPU 10 processes information. The ROM 30 is a read-only nonvolatile storage device and stores programs such as firmware. The HDD 40 is a nonvolatile storage device that can read/write information and stores the OS, various control programs, and application programs etc. In addition to the HDD, semiconductor memory devices such as a Solid State Drive (SSD) can be used.

The I/F 50 connects the bus 80 with various hardware and network, etc. and controls them. The LCD 60 is a visual user interface to check status of the information processing device. The operational unit 70 is a user interface such as a keyboard, mouse, various hardware buttons, and touch panel to input information to the information processing device. It should be noted that the mobile device 2 functions as the control panel of the image processing apparatus 1 in the system of this embodiment. Consequently, the user interfaces connected to the image processing apparatus 1 directly such as the LCD 60 and the operational unit 70 can be omitted.

In this hardware configuration described above, programs stored in storage devices such as the ROM 30, HDD 40, and optical discs (not shown in figures) are read to the RAM 20, and a software controlling unit is constructed by executing operation in accordance with the programs by the CPU 10. Functional blocks that implement functions of apparatuses that consist of the image processing system of this embodiment are constructed by a combination of the software controlling units described above and hardware.

Next, functions of the image processing apparatus 1 in this embodiment are described below.

Figure 3:
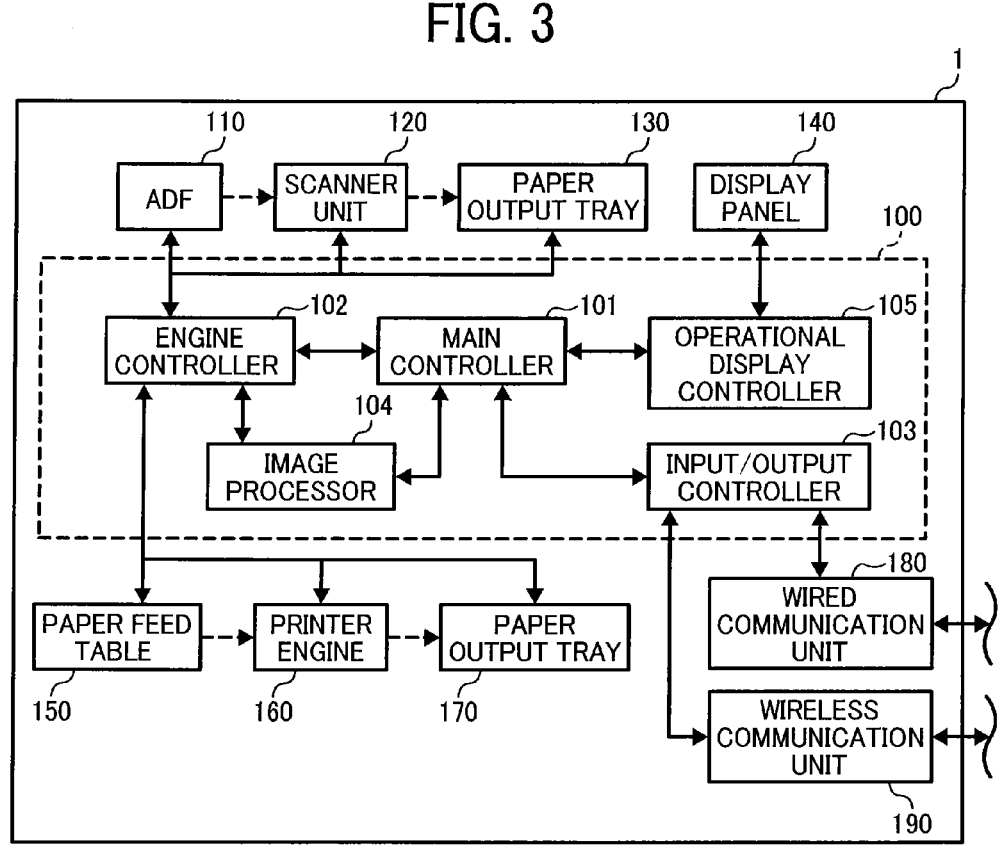
FIG. 3 is a block diagram illustrating a functional configuration of the image processing apparatus as an embodiment of the present invention.

FIG. 3 is a block diagram illustrating a functional configuration of the image processing apparatus 1. As shown in FIG. 3, the image processing apparatus 1 includes a controller 100, an Auto Document Feeder (ADF) 110, a scanner unit 120, a paper output tray 130, a display panel 140, a paper feed table 150, a print engine 160, a paper output tray 170, a wired communication unit 180, and a wireless communication unit 190.

The controller 100 includes a main controller 101, an engine controller 102, an input/output controller 103, an image processor 104, and an operational display controller 105. As shown in FIG. 3, the image processing apparatus 1 in this embodiment is constructed as the MFP that includes the scanner unit 120 and the print engine 160. In FIG. 3, solid arrows indicate electrical connections, and dashed arrows indicate flow of paper.

The display panel 140 is both an output interface that displays status of the image processing apparatus 1 visually and an input interface (operational unit) to operate the image processing apparatus 1 directly or input information to the image processing apparatus 1. While the display panel 140 is realized by the LCD 60 and the operational unit 70 shown in FIG. 2, it is possible to configure only the mobile device 2 as the user interface of the image processing apparatus 1 and omit the display panel 140. In addition, instead of the mobile device 2 described above, an information processing device controlled by an OS different from the main unit of the image processing apparatus 1 can be wired connected to the main unit of the image processing apparatus 1 fixedly to be used only as the input interface (operational unit) described above for the image processing apparatus 1.

The wired communication unit 180 is an interface that the image processing apparatus 1 communicates with other apparatuses by wired communication, and Ethernet and USB interface are used for the wired communication unit 180. The wireless communication unit 190 is an interface that the image processing apparatus 1 communicates with other apparatuses by wireless communication, and interfaces such as Wireless Fidelity (Wi-Fi) and FeliCa are used as the wireless communication unit 190. The image processing apparatus 1 exchanges information with the mobile device 2 using the wired communication unit 180 or the wireless communication unit 190. In the case of the information processing device wired connected to the main unit of the image processing apparatus 1 instead of the mobile device 2, the information processing device exchanges information with the main unit of the image processing apparatus 1 using the wired communication unit 180 or the wireless communication unit 190.

The controller 100 combines software and hardware. In particular, control programs such as firmware stored in nonvolatile storage devices such as the ROM 30 and the HDD 40 are loaded into the RAM 20, and the software controlling unit is implemented by executing operations by the CPU 10 in accordance with the programs. The controller 100 is constructed of the software controlling unit and hardware such as integrated circuits. The controller 100 functions as a controller that controls the whole part of the image processing apparatus 1.

The main controller 101 controls each unit included in the controller 100 and commands each unit in the controller 100. The engine controller 102 controls and drives the print engine 160 and the scanner unit 120. The input/output controller 103 inputs signals and commands input via the wired communication unit 180 and the wireless communication unit 190 to the main controller 101. In addition, the main controller 101 controls the input/output controller 103 and accesses other apparatuses such as the mobile device 2 via the wired communication unit 180 and the wireless communication unit 190.

The image processor 104 generates drawing information based on image information to be printed and output under the control of the main controller 101. The drawing information is information that the print engine 160 as an image forming unit draws as an image to be formed in an image forming operation. The image processor 104 processes image pickup data input from the scanner unit 120 and generates image data. The generated image data is stored in the image processing apparatus 1 as a result of the scanner operation or transferred to another apparatus via the wired communication unit 180 and the wireless communication unit 190. The operational display controller 105 displays information on the display panel 140 and reports information input via the display panel to the main controller 101.

In the case of image processing apparatus that only has the printer function, the ADF 110, the scanner unit 120, and the paper output tray 130 shown in FIG. 3 are omitted, and functions to control the ADF 110, the scanner unit 120, and the paper output tray 130 are omitted from functions included in the engine controller 102.

If the image processing apparatus 1 functions as the printer, first, the input output controller 103 receives a print job via the wired communication unit 180 and the wireless communication unit 190. The received print job was generated by the information processing device that requests the image processing apparatus 1 to execute printing. In addition, the print job includes header information to indicate that it is the print job, image information to be output, and parameter information to be configured to execute printing.

The input/output controller 103 transfers the received print job to the main controller 101. After receiving the print job, the main controller 101 generates the drawing information based on the document information and image information included in the print job by controlling the image generator 104. After the image generator 104 generates the drawing information, the engine controller 102 executes forming an image on paper carried from the paper feed table 150 based on the generated drawing information. As particular examples of the print engine 160, image forming mechanisms such as inkjet method and electrophotography method can be used. After the print engine 160 forms the image on the paper, the paper is ejected on the paper output tray 170.

If the image processing apparatus 1 functions as a scanner, in response to a command to execute scanning input by operation on the display panel 140 or from an external apparatus via the wired communication unit 180 and the wireless communication unit 190, the operational display controller 105 or the input/output controller 103 transfers a signal to execute scanning to the main controller 101. The main controller 101 controls the engine controller 102 based on the received signal to execute scanning. The engine controller 102 drives the ADF 110 and carries a document to be scanned set on the ADF 110 to the scanner unit 120. In addition, the engine controller 102 drives the scanner unit 120 and scans the document carried from the ADF 110. If the document is not set on the ADF 110 and the document is set on the scanner unit 120 directly, the scanner unit 120 scans the set document under the control of the engine controller 102. That is, the scanner unit 120 functions as the image pickup unit.

In scanning operation, an image pickup device such as CCD included in the scanner unit 120 scans the document optically, and image pickup information is generated based on the optical information. The engine controller 102 transfers the image pickup information generated by the scanner unit 120 to the image processor 104. The image processor 104 generates the image information based on the image pickup information received from the engine controller 102 under the control of the main controller 101. The image information generated by the image processor 104 is stored in the storage device such as the HDD 40 attached to the image processing apparatus 1. The image information generated by the image processor 104 is either stored in the HDD 40 etc. as is or transferred to an external apparatus by the input/output controller 103 via the wired communication unit 180 or the wireless communication unit 190 depending on the user command.

If the image processing apparatus 1 functions as a copier, the image processor 104 generates the drawing information based on either the image pickup information received from the scanner unit 120 by the engine controller 102 or the image information generated by the image processor 104. Similarly as the printer operation, the engine controller 102 drives the print engine 160 based on the drawing information.

Figure 4:
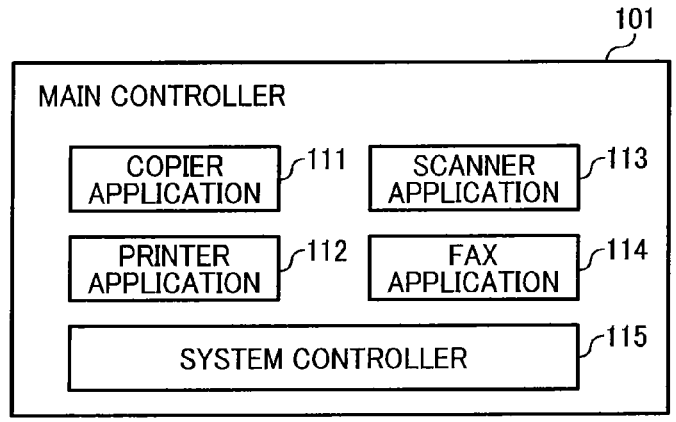
FIG. 4 is a block diagram illustrating a functional configuration of a controller in the image processing apparatus as an embodiment of the present invention.

In the configuration of the image processing apparatus 1 described above, the main controller 101 in this embodiment includes a function to use the mobile device 2 as the user interface. The function included in the main controller 101 to use the mobile device 2 as the user interface is described below with reference to FIG. 4. As shown in FIG. 4, the main controller 101 in this embodiment includes a copier application 111, a printer application 112, a scanner application 113, a fax application 114, and a system controller 115

The copy application 11 is software to control the copy function. The printer application 112 is software to control the print function. The scanner application 113 is software to control the scan function. The fax application 114 is software to control the facsimile function. If the image processing apparatus functions as a copier, printer, scanner, or fax, those functions can be realized by executing each application that corresponds to the function described above.

The system controller 115 in the main controller 101 controls the whole part of the apparatus. In addition, the system controller 115 also controls the mobile device 2 in this embodiment to use as the user interface.

Figure 5:
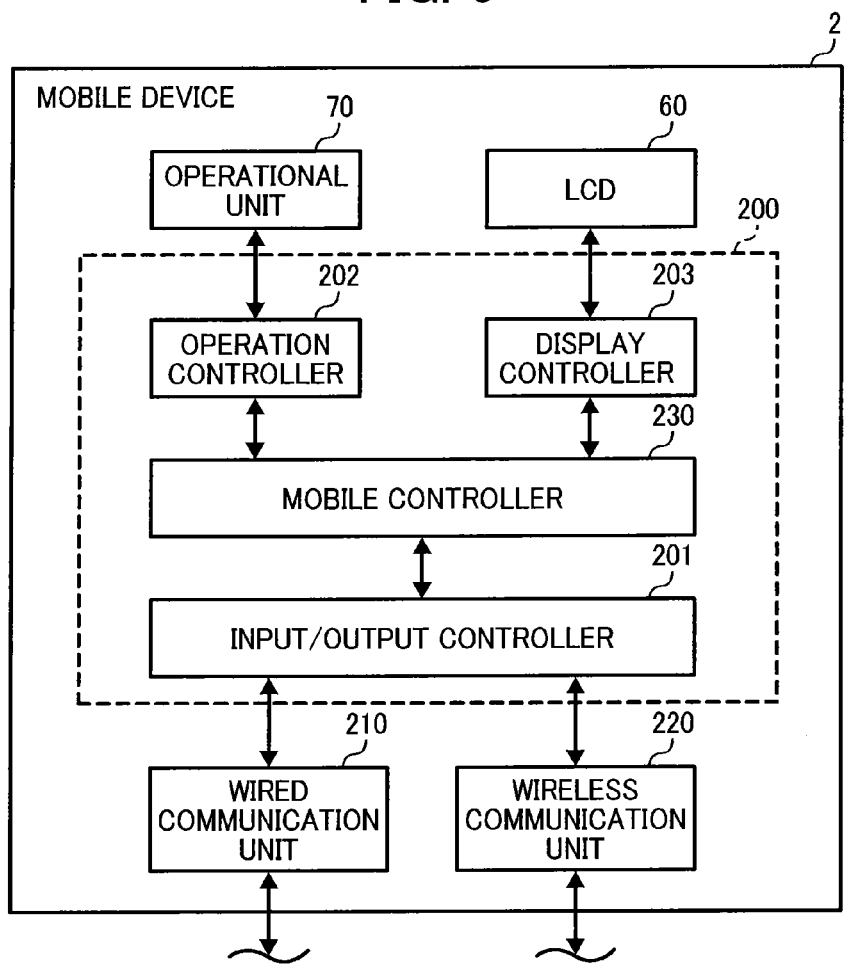
FIG. 5 is a block diagram illustrating a functional configuration of a mobile device as an embodiment of the present invention.

Next, a functional configuration of the mobile device 2 in this embodiment is described below with reference to FIG. 5. As shown in FIG. 5, the mobile device 2 in this embodiment includes a controller 200, a wired communication unit 210, and a wireless communication unit 220 in addition to the LCD 60 and the operational unit 70 shown in FIG. 2. The controller 200 includes an input/output controller 201, an operation controller 202, a display controller 203, and a mobile controller 230.

The wired communication unit 210 is an interface that the mobile device 2 communicates with other apparatuses via a network, and Ethernet and USB interface are used for the wired communication unit 210. The wireless communication unit 220 is an interface that the mobile device 2 communicates with other apparatuses by wireless communication, and interfaces such as Bluetooth, Wi-Fi, and FeliCa are used as the wireless communication unit 220. The wired communication unit 210 and the wireless communication unit 220 can be realized by the I/F 50 shown in FIG. 2.

The controller 200 combines software and hardware. The controller 200 controls the whole part of the mobile device 2. The input/output controller 201 acquires information input via the wired communication unit 210 and transfers information to other apparatuses via the wired communication unit 210. In addition, the input/output controller 201 acquires information input via the wireless communication unit 220 and transfers information to other apparatuses via the wireless communication unit 220.

The operation controller 202 acquires a signal of user operation on the operational unit 70 and input the signal to a module that operates on the mobile device 2 such as the mobile controller 230. The display controller 203 displays status of the mobile device 2 such as graphical user interface (GUI) of the mobile controller 230 on the LCD 60 as a display unit of the mobile device 2.

The mobile controller 230 controls the whole part of the mobile device 2 by commanding each unit by the controller 200. The mobile controller 230 is implemented by the OS, middleware, and various applications. A function to control displaying a screen on the LCD 60 via the display controller 203 among functions included in the mobile controller 230 is the key point in this embodiment.

As an application installed on the mobile device 2, an application that the mobile device 2 functions as a user interface of the image processing apparatus 1 is included. In particular, the application accepts a configuration value to control the copy function by the copier application 111, to control the print function by the printer application 112, to control the scanner function by the scanner application 113, and to control the fax function by the fax application 114 shown in FIG. 4 each is included.

Figure 6:
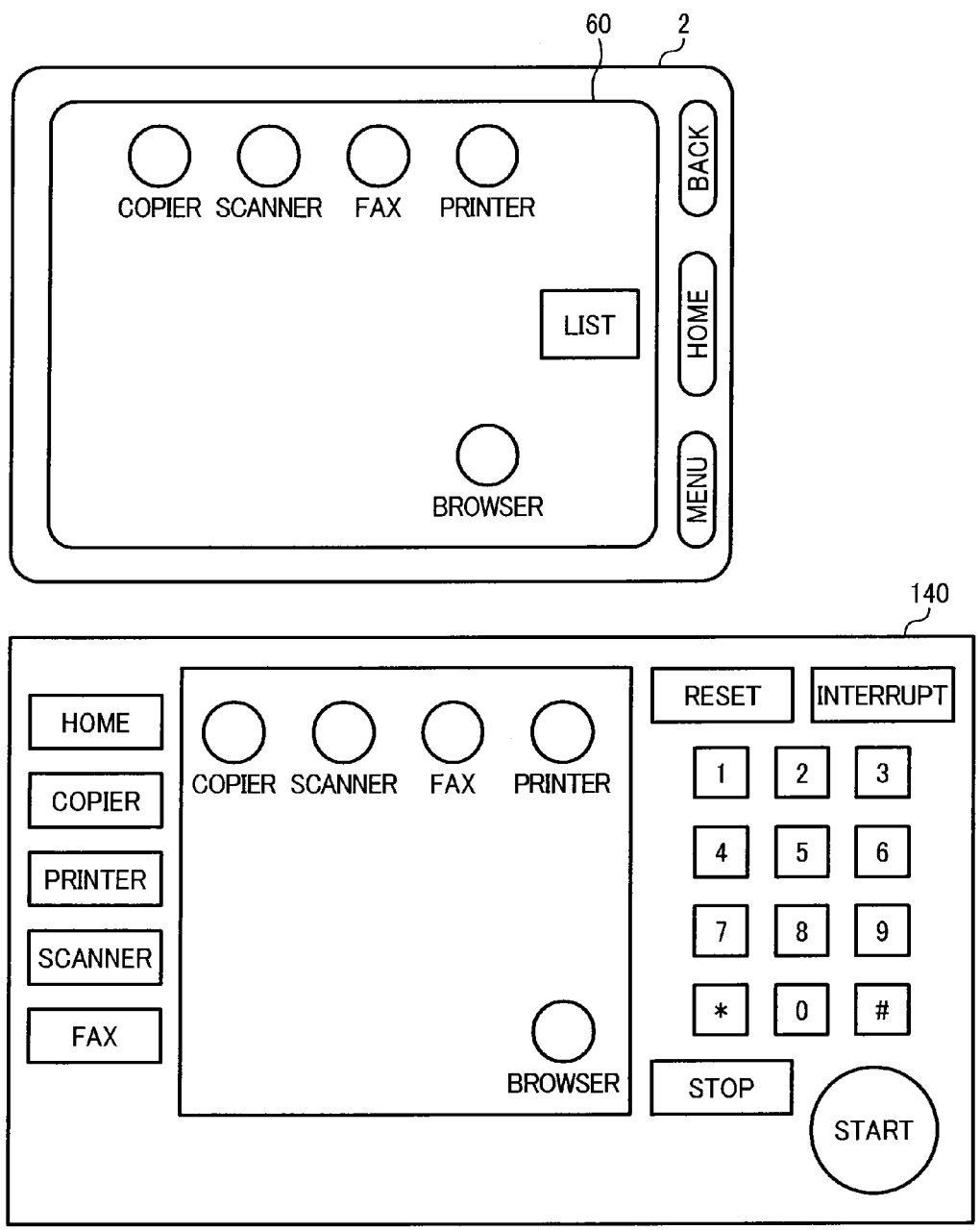
FIG. 6 is a diagram illustrating screens on the mobile device and a display panel as an embodiment of the present invention.

FIG. 6 is a diagram illustrating screens displayed on the LCD 60 of the mobile device 2 and the display panel 140 of the image processing apparatus 1 in this embodiment. The upper part of FIG. 6 illustrates the mobile device 2, and the lower part of FIG. 6 illustrates the display panel 140. In FIG. 6, the home screen is displayed on each of the mobile device 2 and the display panel 140.

As shown in FIG. 6, on the home screens in this embodiment, icons to launch applications installed on the mobile device 2 such as "copier", "scanner", "fax", "printer", and "browser" are displayed. Among these applications, "copier" is the application for accepting the configuration value used by the copier application 111 in FIG. 4 to control the copy function, "scanner" is the application for accepting the configuration value used by the scanner application 113 in FIG. 4 to control the scan function, "fax" is the application for accepting the configuration value used by the fax application 114 in FIG. 4 to control the fax function, and "printer" is the application for accepting the configuration value used by the printer application 112 in FIG. 4 to control the print function.

The home screen in FIG. 6 displayed on the mobile device 2 is implemented by functions of the OS and middleware among software consisting of the mobile controller 230. In the upper part of FIG. 6, by pressing a home button labeled as "home", the mobile controller 230 switches the display of the LCD 60 into the home screen shown in the upper part of FIG. 6 via the display controller 203 from whichever screen displayed on the mobile device 2.

In the image processing apparatus 1, the home screen in FIG. 6 is displayed by the system controller 115 shown in FIG. 4. In the lower part of FIG. 6, by pressing a home button labeled as "home", the system controller 115 switches the display of the display panel 140 into the home screen shown in the lower part of FIG. 6 via the display controller 203 from whichever screen displayed on the display panel 140.

Figure 7:
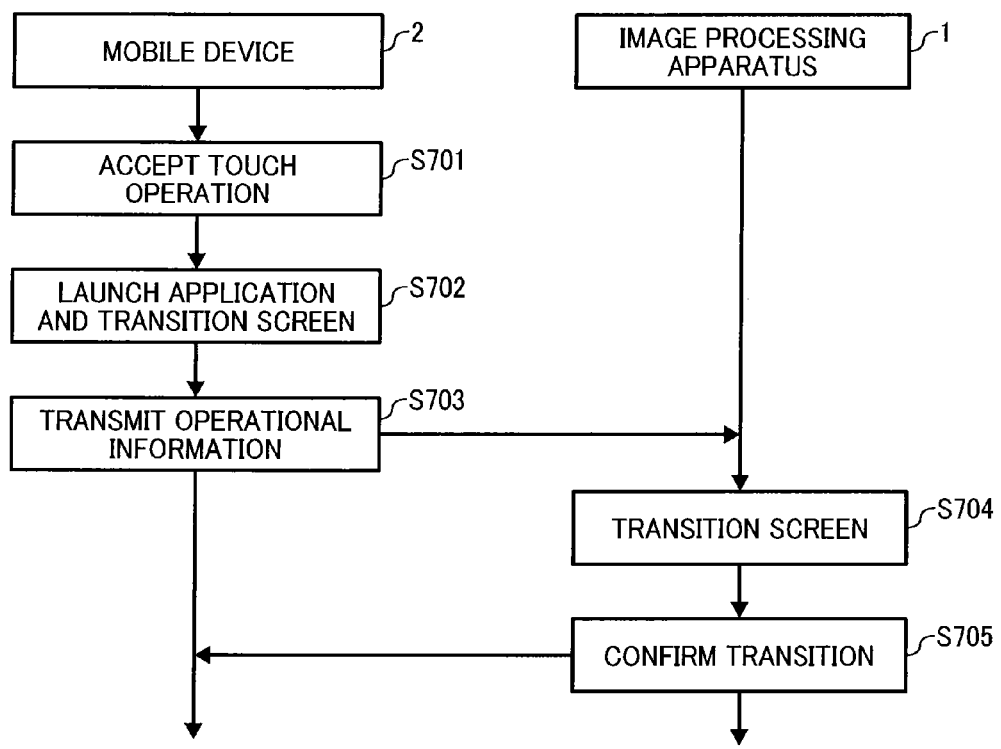
FIG. 7 is a sequence diagram illustrating a process performed by the system as an embodiment of the present invention.

Next, in the system in this embodiment, an operation in case of switching the screen displayed on the mobile device 2 is described below with reference to FIG. 7. FIG. 7 is a sequence diagram illustrating a process that transitions from the home screen to a copy screen by operating the mobile device 2 in the system in this embodiment.

As shown in FIG. 7, if an icon labeled a "copy" in the home screen displayed on the mobile device 2 in the upper part of FIG. 6 is touched by user operation, the operation controller 202 in the mobile device 2 accepts the operation via the operational unit 70 as the touch panel in S701. After accepting the operation by a signal from the operational unit 70, the operation controller 202 inputs content of the accepted operation, i.e., information that indicates that the "copy" icon was touched in this case, to the mobile controller 230

Based on the content of the operation received from the operation controller 202, the mobile controller 230 launches an application corresponding to the touched icon, i.e., an application that includes a Graphical User Interface (GUI) for inputting the configuration of the copier application 111 in this case, and instructs the display controller 203 to display the GUI on the LCD 60 in S702. If the target application has already been launched in the background in S702, the mobile controller 230 switches the screen only. That is, in S702, the mobile controller 230 and the display controller 203 cooperate to control the screen on the LCD 60 as the display unit.

After S702, first, the screen displayed on the mobile device 2 switches into the GUI for inputting the configuration of the copier application 111 as shown in the upper part of FIG. 8A. Subsequently, the mobile controller 230 transfers operational information that indicates that the screen on the mobile device 2 has been switched into the screen for the copier application to the image processing apparatus 1 in S703. The operational information is transferred in S703 via the wired communication unit 210 or the wireless communication unit 220 under the control of the input/output controller 201. That is, in S703, the mobile controller 230 and the input/output controller 201 cooperate to function as an operational information transmitter.

The operational information transferred to the image processing apparatus 1 is input into the system controller 115 in the main controller 101 via the input/output controller 103. After acquiring the operational information transferred from the mobile device 2, the system controller 115 performs processing in accordance with the content of the operational information. In this case, as the content of the operational information, it is shown that the screen on the mobile device 2 has been switched into the screen for the copier application.

Figure 8B:
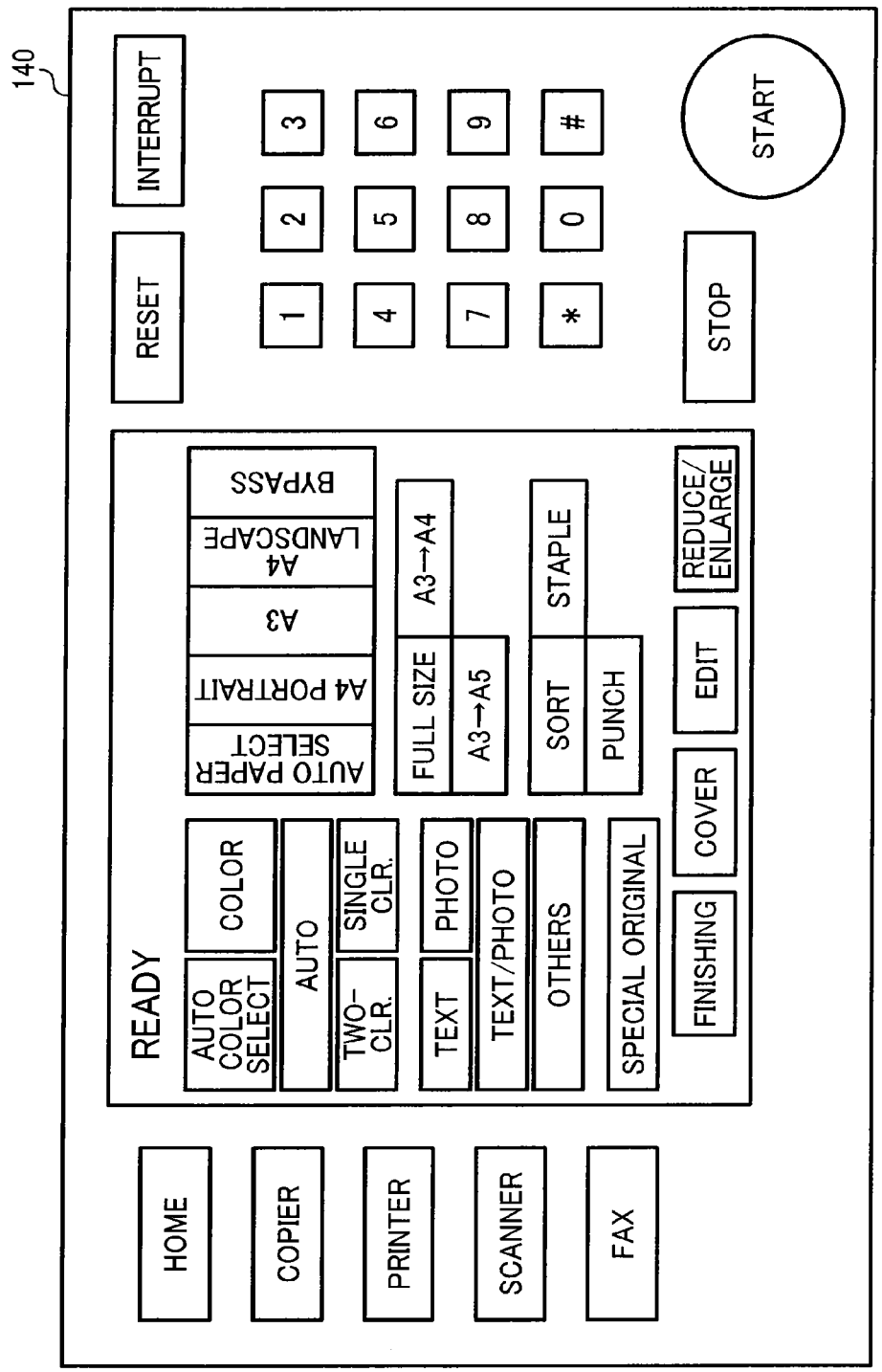

Accordingly, the system controller 115 instructs the operational display controller 105 to transition the screen on the display panel 140 so that the GUI of the copier application 111 is displayed on the display panel 140 in S704. That is, the system controller 115 and the operational display controller 105 cooperate to function as an image processing apparatus screen transition processor. Consequently, the screen displayed on the display panel 140 in the image processing apparatus 1 is switched into the GUI of the copier application 111 as shown in FIG. 8B just like the screen displayed on the mobile device 2. As shown in FIGS. 8A and 8B, the GUI displayed on the display unit of the mobile device 2 is almost the same as the GUI displayed on the display panel 140 in the image processing apparatus 1, and they can accept inputting the same information.

In the image processing apparatus 1, after finishing the control based on the operational information received from the mobile device 2, i.e., transitioning the screen to the GUI of the copier application 111 in this case, the system controller 115 reports confirmation of the transition to the mobile device 2 in S705. Accordingly, the mobile device 2 can recognize that the screens are in synchronization with each other. The transition confirmation report is transferred in S705 via the wired communication unit 180 or the wireless communication unit 190 under the control of the input/output controller 103.

As described above, the control that switches the screen of the image processing apparatus 1 by the user operation on the mobile device 2 can be realized. In FIG. 7, the case in which the home screen transitions to the copier screen by touching the icon displayed on the home screen of the mobile device 2 is described. Similarly, in case of pressing the home button described above, the transition to the home screen is the same. That is, in S701 shown in FIG. 7, pressing the home button is detected instead of accepting the touch operation, and it is performed to transition to the home screen in S702 and 5704 in that case.

In the configuration and control described above, the key point in this embodiment is to solve the contradiction between the screens in case the image processing apparatus 1 cannot switch the screen due to the status of the apparatus even if the home button labeled as "home" on the mobile device 2 is pressed and the screen on the mobile device 2 transitions to the home screen. The key point in this embodiment is described in detail below.

Figure 9A:
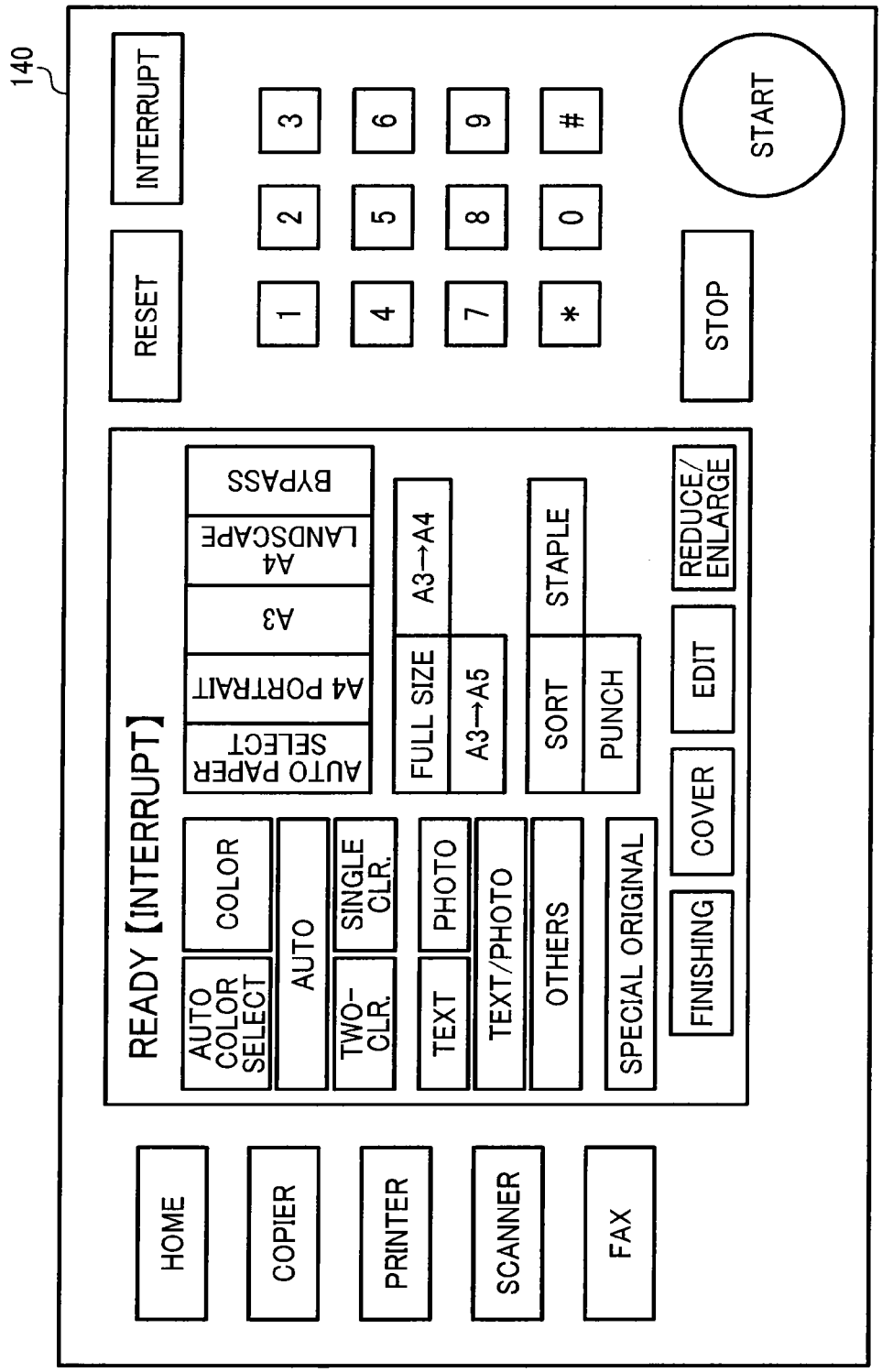
FIGS. 9A and 9B are diagrams illustrating screens on the display panel as an embodiment of the present invention.
Figure 9B:
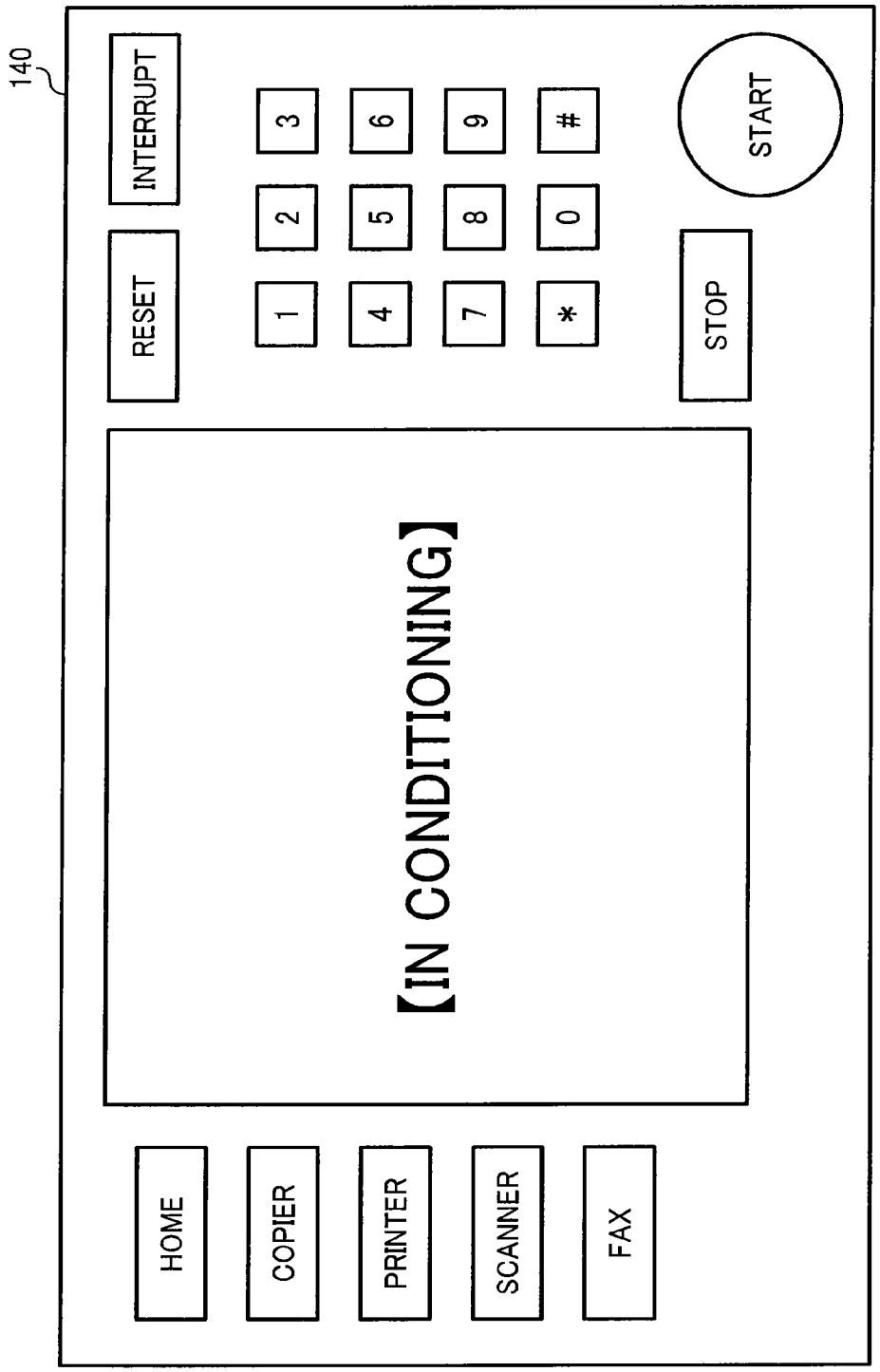

First, the case in which the image processing apparatus 1 cannot switch the screen is described. FIGS. 9A and 9B are diagrams illustrating examples in which the image processing apparatus 1 cannot switch the screen. FIG. 9A is a diagram illustrating the screen on the display panel 140 during an interrupt copy. FIG. 9B is a diagram illustrating the screen on the display panel 140 while the image processing apparatus 1 is in conditioning.

As shown in FIGS. 9A and 9B, in the image processing apparatus 1, it is possible that the screen on the display panel 140 is fixed and cannot be transitioned to other screens until predefined operation is finished in some cases. Other example cases in which the screen on the display panel 140 is fixed are such as an initialization setting screen and service call screen.

On the other hand, the GUIs corresponding to each of the applications displayed on the mobile device 2 are interfaces for inputting parameters used for the operation of the applications and commands to execute functions, and they do not cooperate with the control of the hardware module and software module included in the image processing apparatus 1. Consequently, in case of pressing the home button on the mobile device 2, the screen on the mobile device 2 transitions to the home screen shown in the upper part of FIG. 6 regardless of the operational status of the image processing apparatus 1.

However, in the image processing apparatus 1, in case of reporting the notification in S703 shown in FIG. 7, i.e., the operational information in this case, while the screen, e.g., the screens shown in FIGS. 9A and 9B (hereinafter referred to as "untransitionable screen"), is displayed, the screen transition process in S704 is not performed, and the screen shown in FIGS. 9A and 9B is maintained. As a result, the screen on the mobile device 2 conflicts with the screen on the display panel 140 in the image processing apparatus 1.

By contrast, in the system in this embodiment, the conflict between the screens can be prevented by using the notification in S705 shown in FIG. 7 due to the function of the system controller 115 in the main controller 105 of the image processing apparatus 1. The operation of the system controller 115 after receiving the report of the operational information from the mobile device 2 is described below in detail with reference to flowchart in FIG. 10.

Figure 10:
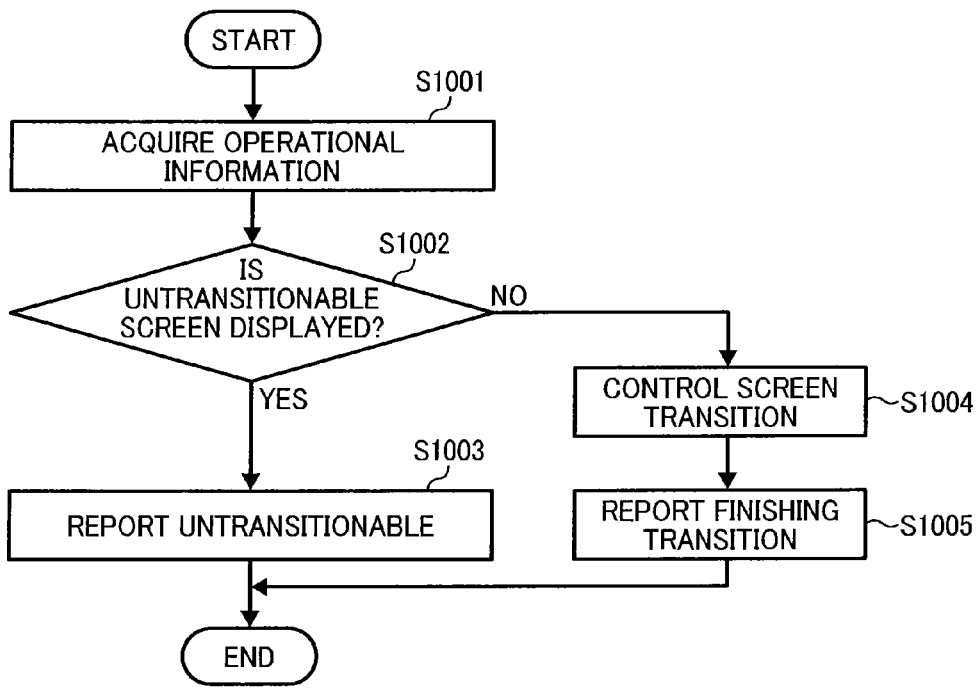
FIG. 10 is a flowchart illustrating a process performed by the image processing apparatus as an embodiment of the present invention.

As shown in FIG. 10, after acquiring the operational information from the mobile device 2 in S1001, the system controller 115 checks whether or not the untransitionable screen is displayed currently in S1002. After checking, in case of not displaying the untransitionable screen currently (NO in S1002), the system controller 115 controls transitioning to a specified screen in S1004 and reports that the transition finishes in S1005, and the process ends. By contrast, in case of displaying the untransitionable screen currently (YES in S1002), the system controller 115 notifies the mobile device 2 that the screen is not transitionable in S1003, and the process ends. That is, in S1002, the system controller 115 functions as an untransitionable screen notification unit.

Next, the operation of the mobile device 2 after receiving the untransitionable notification in S1003 is described below in detail with reference to flowchart in FIG. 11. The untransitionable notification reported to the mobile device 2 is input into the mobile controller 230. After acquiring the untransitionable notification in S1101, the mobile controller 230 instructs the display controller 203 to display a screen reporting that the screen is untransitionable as shown in FIG. 12 on the LCD 60 in S1102.

Subsequently, the mobile controller 230 refers to history of screen transition in the mobile device 2 and rewinds the screen to adjacent screen in S1103, and the process ends.

Consequently, the screen displayed on the mobile device 2 returns to the state in which it synchronizes with the screen on the display panel 140 in the image processing apparatus 1, and the conflict between the screen on the mobile device 2 and the screen on the image processing apparatus 1 is resolved.

Figure 11:
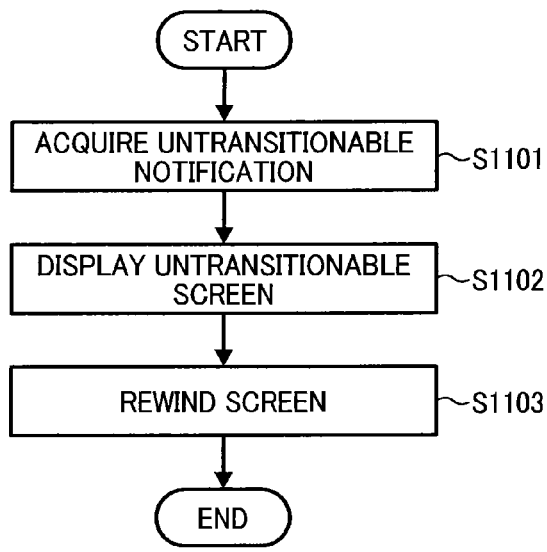
FIG. 11 is a flowchart illustrating a process performed by the mobile device as an embodiment of the present invention.
Figure 12:
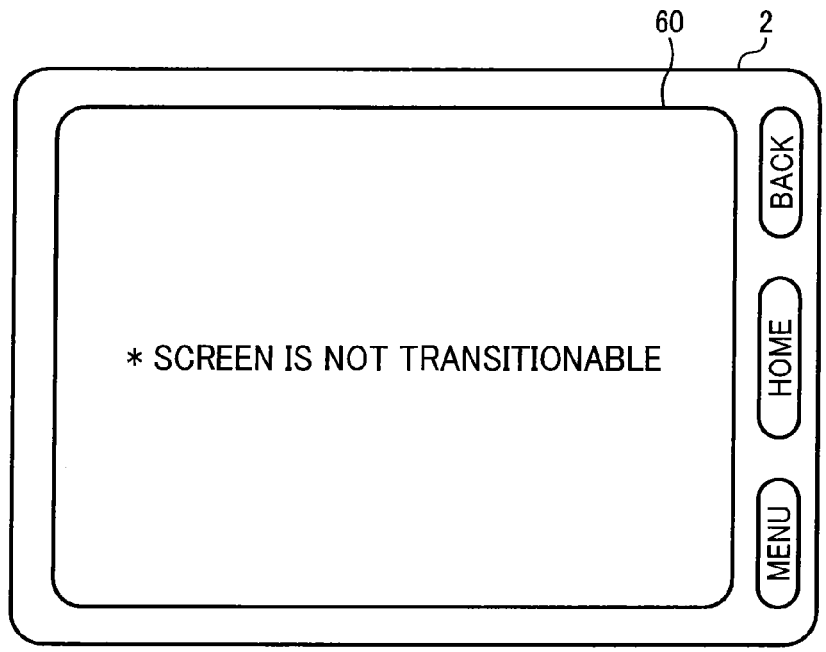
FIG. 12 is a diagram illustrating a screen on the mobile device as an embodiment of the present invention.

The steps from S1102 to S1103 in FIG. 11 can proceed automatically after predetermined time elapses. Otherwise, the steps from S1102 to S1103 can proceed by user operation that confirms the screen shown in FIG. 12. If the screen that is untransitionable by user operation such as the interrupt copy shown in FIG. 9A is displayed, it is possible to display a screen that prompts to finish the previous operation shown in FIG. 13 without returning to the adjacent screen automatically and solve the conflict between the screens by user operation.

In either case, in the mobile device 2 in this embodiment, if operation involving the screen transition performed, the operational information is reported to the image processing apparatus 1, and the mobile device 2 acquires the information indicating whether or not the screen in the image processing apparatus 1 is transitionable. If the screen in the image processing apparatus 1 is untransitionable, the screen displayed on the mobile device 2 is returned to the status before the transition.

Figure 13:
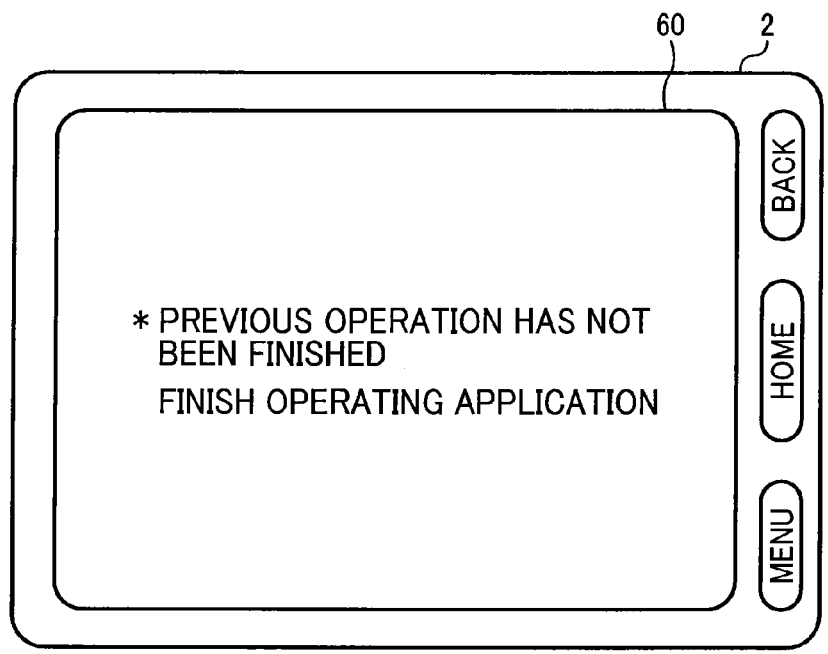
FIG. 13 is a diagram illustrating a screen on the mobile device as an embodiment of the present invention.

The representative example case of getting the screen back to the status before transition is the steps from S1102 to S1103 in FIG. 11. That is, after reporting that the screen in the image processing apparatus is untransitionable, the screen is returned to the status before transition after either elapsing the predetermined time or confirming by user operation. Other than that, as shown in FIG. 13, after displaying the screen prompting to finish the previous operation, the case in which the conflict between the screens is solved by user operation is included in the case of getting the screen back to the status before transition in the broad sense of the term.

In order to synchronize the screen in the image processing apparatus 1 with the screen on the mobile device 2, the step in S702 shown in FIG. 7, that is, the case in which the screen transition in case of accepting operation involving the screen transition on the mobile device 2 is waited until receiving the response on whether or not the screen is transitionable can be considered. However, in the general mobile device 2, the operation transitioning to the home screen is the forcible operation embedded in the OS or middleware, and it is difficult for the application installed afterwards to control such operation.

By contrast, in the system in this embodiment, since the screen is got back in accordance with the status of the image processing apparatus 1 after transitioning to the home screen, the problem described above can be resolved.

As described above, in the system in which the mobile device is used as the control panel of the image processing apparatus in this embodiment, in case of receiving the command involving the screen transition, the image processing apparatus determines whether or not the screen is transitionable. If the screen is untransitionable, that is reported to the mobile device. Consequently, the mobile device can recognize that the image processing apparatus 1 could not finish transitioning the screen, and the mobile device can perform the operation to resolve the conflict between the screens. As a result, the conflict between the screen on the mobile device and the image processing apparatus can be prevented.

Figure 14:
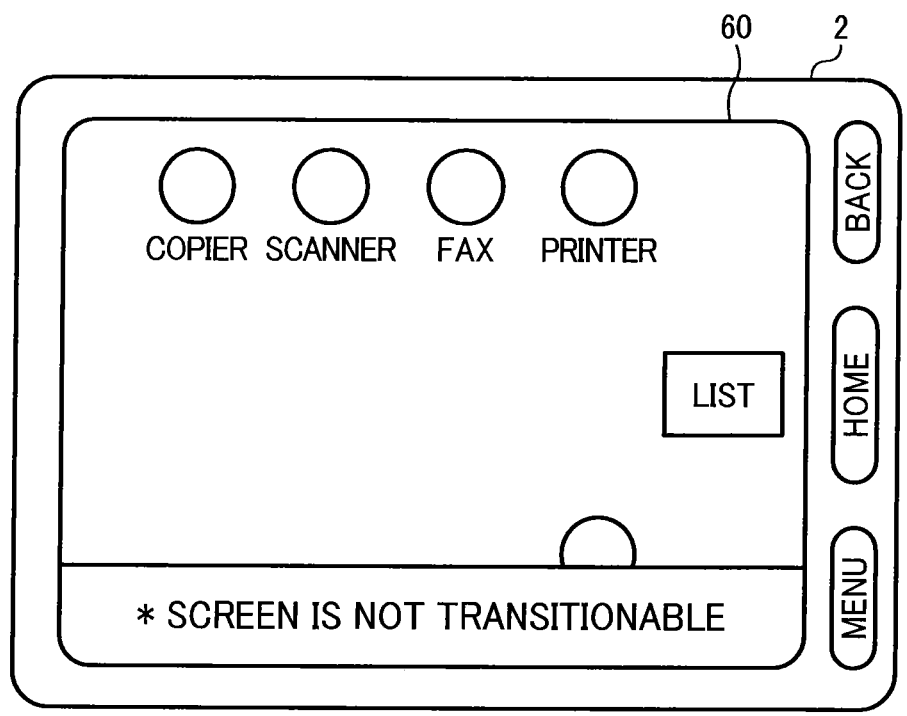
FIG. 14 is a diagram illustrating a screen on the mobile device as an embodiment of the present invention.

In the embodiment described above, the mobile device 2 switches the whole screen and reports that the screen not transitionable. Alternatively, it is possible to display the notification on a part of the screen displayed on the mobile device 2 as shown in FIG. 14. In this case, the step proceeding to S1103 shown in FIG. 11 can be determined by touching the notification area shown in FIG. 14 other than after elapsing the predetermined time as described above.

In addition, in the embodiment described above, the mobile device 2 recognizes that the screen transition is not finished by receiving the untransitionable screen notification from the image processing apparatus 1. However, the key point of the system in this embodiment is that the mobile device 2 recognizes that the screen in the image processing apparatus 1 is untransitionable in case of pressing the home button on the mobile device 2.

Consequently, it is not limited to the untransitionable screen notification by the image processing apparatus 1, and other method that the mobile device 2 can recognize the status of the image processing apparatus 1 can be used. For example, in parallel with transferring the operational information in S703 shown in FIG. 7, the mobile device 2 can ask the image processing apparatus 1 whether or not the screen is transitionable. In this case, the mobile device 2 can recognize whether or not the screen in the image processing apparatus 1 transitionable based on the response from the image processing apparatus 1 to the inquiry from the mobile device 2.

In another embodiment described above, the operation can be realized by implementing interface to reply whether or not the screen is transitionable via the network (hereinafter referred to as "screen transition status interface") as a function of the system controller 115 in the main controller 101 of the image processing apparatus 1. The mobile device 2 can recognize whether or not the screen is transitionable by using the interface implemented in the system controller 115 described above via the network.

In addition, the mobile device 2 can recognize the status of the image processing apparatus 1 via an apparatus other than the mobile device 2 and the image processing apparatus 1. For example, a third information processing device communicably connected with the mobile device 2 and the image processing apparatus 1 via the network and grasps whether or not the screen in the image processing apparatus 1 is transitionable in real time by receiving the notification from the screen transition status interface described above or the system controller 115 can be included in the system.

In this case, after receiving the information on whether or not the screen in the image processing apparatus 1 is transitionable from the third information processing device, the mobile device 2 can perform the process the same as described above and achieve the similar effect. Regarding a trigger that the mobile device 2 receives the information on whether or not the screen is transitionable from the third information processing device, one example case is that the mobile device 2 inquires in parallel with the step in S703 shown in FIG. 7. Another example case is that the image processing apparatus 1 entrusts the third information processing device with reporting. Yet another example case is that the third information processing device detects the notification of the operational information from the mobile device 2 to the image processing apparatus 1.

In the embodiments described above, the mobile device 2 is used as the operational unit of the image processing apparatus 1. Alternatively, it is possible to wired connect an information processing device controlled by OS different from the main unit of the image processing apparatus 1 to the main unit of the image processing apparatus 1 fixedly so that the information processing device functions as the control panel of the main unit of the image processing apparatus 1 dedicatedly. In this case, example embodiments of the present invention can be effective since the operational unit emulates the screen generated by the image processing apparatus 1, and the screen generated by the operational unit itself can conflict with the screen generated by the image processing apparatus 1 in some cases.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. An image processing system, comprising:
    an information processing device comprising:
        a display to display a screen;
        a display controller to control displaying a screen on the display in accordance with a user operation involving transition of the displayed screen; and
        an operational information transmitter to transfer operational information on the user operation involving the transition of the displayed screen; and
    an image processing apparatus comprising an image processing apparatus screen transition processor to perform transition of screen on the image processing apparatus in accordance with receiving the operational information,
    wherein the display controller acquires status on transitioning the screen of the image processing apparatus in accordance with the user operation instructing to transition to a home screen as a starting point of the user operation and gets the screen displayed on the display back to status before the transition if the screen on the image processing apparatus is untransitionable.

2. The image processing system according to claim 1, wherein the image processing apparatus further comprises an untransitionable screen notification unit to notify the information processing device that the screen is untransitionable in case of receiving the operational information if the screen on the image processing apparatus is untransitionable, and the display controller acquires the notification from the untransitionable screen notification unit as information indicating status of the transition of the screen on the image processing apparatus.

3. The image processing system according to claim 1, wherein the display controller requests the image processing apparatus to transfer the status of the transition of the screen of the image processing apparatus in accordance with the user operation instructing to transition to the home screen.

4. The image processing system according to claim 1, wherein the display controller gets the screen displayed on the display back to status before the transition after displaying a notification screen reporting that the screen is untransitionable if the screen on the image processing apparatus is untransitionable.

5. The image processing system according to claim 4, wherein the display controller gets the screen displayed on the display back to status before the transition after elapsing a predetermined period.

6. The image processing system according to claim 4, wherein the display controller gets the screen displayed on the display back to status before the transition in accordance with the user operation on the notification screen.

7. An image processing apparatus control method that uses an information processing device to control the image processing apparatus, comprising the steps of:
    controlling displaying of a screen on a display of the information processing device in accordance with a user operation involving transition of the displayed screen;
    transferring operational information on the user operation involving the transition of the displayed screen, to the image processing apparatus to cause transitioning the screen on the image processing apparatus;
    acquiring status on transitioning the screen of the image processing apparatus in accordance with the user operation instructing to transition to a home screen as a starting point of the user operation; and
    getting the screen displayed on the display back to status before the transition if the screen on the image processing apparatus is untransitionable.

8. A non-transitory, computer-readable recording medium storing a program that, when executed by a computer, causes a processor to implement a method of controlling an image processing apparatus using an information processing device, the method comprising the steps of:
    controlling displaying of a screen on a display of the information processing device in accordance with a user operation involving transition of the displayed screen;
    transferring operational information on the user operation involving the transition of the displayed screen, to the image processing apparatus to cause transitioning the screen on the image processing apparatus;
    acquiring status on transitioning the screen of the image processing apparatus in accordance with the user operation instructing to transition to a home screen as a starting point of the user operation; and
    getting the screen displayed on the display back to status before the transition if the screen on the image processing apparatus is untransitionable.

* * * * *